(12) United States Patent
Harris

(10) Patent No.: US 7,605,600 B2
(45) Date of Patent: Oct. 20, 2009

(54) SYSTEMS, METHODS AND APPARATUS FOR ANTI-SYMMETRIC QUBIT-COUPLING

(75) Inventor: Richard G. Harris, North Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 7 days.

(21) Appl. No.: 12/098,347

(22) Filed: Apr. 4, 2008

(65) Prior Publication Data

US 2008/0258753 A1    Oct. 23, 2008

Related U.S. Application Data

(60) Provisional application No. 60/910,445, filed on Apr. 5, 2007.

(51) Int. Cl.
*H03K 19/195* (2006.01)

(52) U.S. Cl. ..................................... 326/1; 326/3; 326/5

(58) Field of Classification Search .................. 326/1–6
See application file for complete search history.

(56) References Cited

U.S. PATENT DOCUMENTS

| | | | |
|---|---|---|---|
| 6,605,822 B1 | 8/2003 | Blais et al. ..................... 257/34 |
| 6,753,546 B2 | 6/2004 | Tzalenchuk et al. ........... 257/31 |
| 6,838,694 B2 | 1/2005 | Esteve et al. .................. 257/34 |
| 6,984,846 B2 | 1/2006 | Newns et al. .................. 257/31 |
| 7,335,909 B2 | 2/2008 | Amin et al. .................... 257/34 |
| 2005/0001209 A1 | 1/2005 | Hilton et al. .................. 257/20 |
| 2006/0097747 A1 | 5/2006 | Amin .............................. 326/6 |
| 2006/0147154 A1 | 7/2006 | Thom et al. .................... 385/37 |
| 2006/0225165 A1 | 10/2006 | Maassen van den Brink et al. ........................... 977/933 |
| 2007/0180586 A1 | 8/2007 | Amin ........................... 977/755 |
| 2008/0238531 A1 * | 10/2008 | Harris ........................... 327/528 |
| 2009/0078932 A1 * | 3/2009 | Amin ............................ 257/31 |

FOREIGN PATENT DOCUMENTS

| WO | 2004/102470 | 11/2004 |
|---|---|---|
| WO | 2005/093649 | 10/2005 |
| WO | 2006/024939 | 3/2006 |

OTHER PUBLICATIONS

U.S. Appl. No. 60/910,445, filed Apr. 5, 2007, Biamonte et al.
Biamonte et al., "Realizable Hamiltonians for Universal Adiabatic Quantum Computers," arXiv:0704.1287v1 [quant-ph], pp. 1-4, Apr. 10, 2007.
Blatter et al., "Design aspects of superconducting-phase quantum bits," *Physical Review B 63*: 174511-1-174511-9, 2001.
Farhi et al., "Quantum Adiabatic Evolution Algorithms versus Simulated Annealing," MIT-CTP #3228, arXiv:quant-ph/0201031 v1, pp. 1-16, Jan. 8, 2002.

(Continued)

*Primary Examiner*—Anh Q Tran
(74) *Attorney, Agent, or Firm*—Seed IP Law Group PLLC

(57) ABSTRACT

Apparatus, articles and methods relate to anti-symmetric superconducting devices for coupling superconducting qubits.

21 Claims, 4 Drawing Sheets

OTHER PUBLICATIONS

U.S. Appl. No. 60/915,657, filed May 2, 2007, Johnson et al.
U.S. Appl. No. 60/986,554, filed Nov. 8, 2007, Choi.
U.S. Appl. No. 11/950,276, filed Dec. 4, 2007, Berkley et al.
U.S. Appl. No. 12/013,192, filed Jan. 11, 2008, Rose et al.
U.S. Appl. No. 12/017,995, filed Jan. 22, 2008, Harris.
U.S. Appl. No. 12/098,348, filed Apr. 4, 2008, Biamonte et al.
Feynman, "Simulating Physics with Computers," *International Journal of Theoretical Physics 21*(6/7): 467-488, 1982.
Friedman et al., "Quantum superposition of distinct macroscopic states," *Nature 406*: 43-46, Jul. 6, 2000.
Harris et al., "Sign and Magnitude Tunable Coupler for Superconducting Flux Qubits," arXiv:cond-mat/0608253 v1, Aug. 11, 2006.
Il'ichev et al., "Continuous Monitoring of Rabi Oscillations in a Josephson Flux Qubit," *Physical Review Letters 91*(9): 097906-1-097906-4, week ending Aug. 29, 2003.
Maassen van den Brink et al., "Mediated tunable coupling of flux qubits," *New Journal of Physics 7*: 1-18, 2005.
Makhlin et al., "Quantum-state engineering with Josephson-junction devices," *Reviews of Modern Physics 7*:1-18, 2005.
Mooij et al., "Josephson Persistent-Current Qubit," *Science 285*: 1036-1039, Aug. 13, 1999.
Nielsen et al., *Quantum Computation and Quantum Information*, Cambridge University Press, Cambridge, 2000, "7.8 Other implementation schemes," pp. 343-345.
Orlando et al., "Superconducting persistent-current qubit," *Physical Review B 60*(22): 15 398-15 413, Dec. 1, 1999.
Shor, "Introduction to Quantum Algorithms," AT&T Labs—Research, arXiv:quant-ph/0005003 v2, pp. 1-17, Jul. 6, 2001.

* cited by examiner

SYSTEMS, METHODS AND APPARATUS FOR ANTI-SYMMETRIC QUBIT-COUPLING

CROSS REFERENCE TO RELATED APPLICATIONS

This application claims benefit under 37 C.F.R. 119(e) of U.S. Provisional Patent Application Ser. No. 60/910,445, filed Apr. 5, 2007, and entitled "Physical Implementations for a Universal Quantum Computer and Related Coupling Devices", which is incorporated herein by reference in its entirety.

BACKGROUND

1. Field

This disclosure generally relates to devices for coupling qubits.

2. Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi E. et al., "Quantum Adiabatic Evolution Algorithms versus Simulated Annealing" arXiv.org:quant-ph/0201031 (2002), pp 1-16.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device. Examples of qubits include quantum particles, atoms, electrons, photons, ions, and the like.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle = a|0\rangle + b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the |0⟩ basis state or the |1⟩ basis state and thus regaining its similarity to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar in some respects to those used for conventional integrated circuits.

Superconducting qubits are a type of superconducting device that can be included in a superconducting integrated circuit. Typical superconducting qubits, for example, have the advantage of scalability and are generally classified depending on the physical properties used to encode information including, for example, charge and phase devices, phase or flux devices, hybrid devices, and the like. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. Nos. 6,838,694 and 7,335,909.

Examples of flux qubits that may be used include rf-SQUIDs, which include a superconducting loop (or "qubit loop") interrupted by one Josephson junction, or a compound junction (where a single Josephson junction is replaced by two parallel Josephson junctions), or persistent current qubits, which include a superconducting loop (or "qubit loop") interrupted by three Josephson junctions, and the like. See e.g., Mooij et al, 1999, *Science* 285, 1036; and Orlando et al., 1999, *Phys. Rev.* B 60, 15398. Other examples of superconducting qubits can be found, for example, in Il'ichev et al., 2003, *Phys. Rev. Lett.* 91, 097906; Blatter et al., 2001, *Phys. Rev. B* 63, 174511, and Friedman et al., 2000, *Nature* 406, 43. In addition, hybrid charge-phase qubits may also be used.

The qubits may include a corresponding local bias device. The local bias devices may include a metal loop in proximity to a superconducting qubit that provides an external flux bias to the qubit. The local bias device may also include a plurality of Josephson junctions. Each superconducting qubit in the quantum processor may have a corresponding local bias device or there may be fewer local bias devices than qubits. In some embodiments, charge-based readout and local bias devices may be used. The readout device(s) may include a plurality of dc-SQUID magnetometers, each inductively connected to a different qubit within a topology. The readout device may provide a voltage or current. The dc-SQUID magnetometers including a loop of superconducting material interrupted by at least one Josephson junction are well known in the art.

Quantum Processor

A computer processor may take the form of an analog processor, for instance a quantum processor such as a superconducting quantum processor. A superconducting quantum processor may include a number of qubits and associated local bias devices, for instance two or more superconducting qubits. Further detail and embodiments of exemplary quantum processors that may be used in conjunction with the present systems, methods, and apparatus are described in US Patent Publication No. 2006-0225165, U.S. patent application Ser. No. 12/013,192, and U.S. Provisional Patent Application Ser. No. 60/986,554 filed Nov. 8, 2007 and entitled "Systems, Devices and Methods for Analog Processing."

A superconducting quantum processor may include a number of coupling devices operable to selectively couple respective pairs of qubits. Examples of superconducting coupling devices include rf-SQUIDs and dc-SQUIDs, which couple qubits together by flux. SQUIDs include a superconducting loop interrupted by one Josephson junction (an rf-SQUID) or two Josephson junctions (a dc-SQUID). The coupling devices may be capable of both ferromagnetic and anti-ferromagnetic coupling, depending on how the coupling device is being utilized within the interconnected topology. In the case of flux coupling, ferromagnetic coupling implies that parallel fluxes are energetically favorable and anti-ferromagnetic coupling implies that anti-parallel fluxes are energetically favorable. Alternatively, charge-based coupling devices may also be used. Other coupling devices can be found, for example, in US Patent Publication No. 2006-0147154 and U.S. patent application Ser. No. 12/017,995. Respective coupling strengths of the coupling devices may be tuned between zero and a maximum value, for example, to provide ferromagnetic or anti-ferromagnetic coupling between qubits.

Basis

Throughout this specification and the appended claims, the terms "basis" and "bases" are used to denote a set or sets, respectively, of linearly independent vectors that may be combined to completely describe a given vector space. For example, the basis of standard spatial Cartesian coordinates comprises three vectors, the x-axis, the y-axis, and the z-axis. Those of skill in mathematical physics will appreciate that bases may be defined for operator spaces, such as those used to describe Hamiltonians.

BRIEF SUMMARY

At least one embodiment may be summarized as a coupling system including a first superconducting qubit comprising a qubit loop formed by a closed superconducting current path and a compound Josephson junction that interrupts the qubit loop, wherein the compound Josephson junction is formed by a closed superconducting current path that is interrupted by at least two Josephson junctions; a second superconducting qubit comprising a qubit loop formed by a closed superconducting current path and a compound Josephson junction that interrupts the qubit loop, wherein the compound Josephson junction is formed by a closed superconducting current path that is interrupted by at least two Josephson junctions; and a first coupling device that is formed by a closed superconducting current path, wherein the first coupling device is communicably coupleable to the qubit loop of the first qubit and communicably coupleable to the compound Josephson junction of the second qubit.

The first coupling device may be inductively coupled to both the qubit loop of the first qubit and the compound Josephson junction of the second qubit. In some embodiments, the closed superconducting current path that forms the first coupling device may be interrupted by at least one Josephson junction. In some embodiments, the closed superconducting current path that forms the first coupling device may be inductively coupled to a programming interface.

The first qubit, the second qubit, and the first coupling device may form at least a portion of a superconducting quantum processor. In some embodiments, the first coupling device includes a first magnetic flux inductor and a second magnetic flux inductor, wherein the first magnetic flux inductor is positioned to thread a magnetic flux through the qubit loop of the first qubit and the second magnetic flux inductor is positioned to thread a magnetic flux through the compound Josephson junction of the second qubit.

Some embodiments may further include a second coupling device that is formed by a closed superconducting current path, wherein the second coupling device is communicably coupleable to the qubit loop of the second qubit and is communicably coupleable to the compound Josephson junction of the first qubit. The second coupling device may be inductively coupled to both the qubit loop of the second qubit and the compound Josephson junction of the first qubit.

In some embodiments, the closed superconducting current path that forms the second coupling device is interrupted by at least one Josephson junction. In some embodiments, the closed superconducting current path that forms the second coupling device is inductively coupled to a programming interface.

The first qubit, the second qubit, the first coupling device, and the second coupling device may form at least a portion of a superconducting quantum processor.

At least one embodiment may be summarized as a coupling system including a first qubit having a first degree of freedom that is associated with a first basis element and a second degree of freedom that is associated with a second basis element; a second qubit having a first degree of freedom that is associated with the first basis element and a second degree of freedom that is associated with the second basis element; and a coupling device that communicably couples the first degree of freedom of the first qubit with the second degree of freedom of the second qubit, such that the first degree of freedom of the first qubit influences the second degree of freedom of the second qubit.

In some embodiments, the first basis element and the second basis element are orthogonal. In some embodiments, the first qubit is a superconducting qubit comprising a first loop of superconducting material and a compound Josephson junction that interrupts the first loop of superconducting material, the compound Josephson junction comprising a closed loop of superconducting material interrupted by at least two Josephson junctions, where the first loop of superconducting material and the compound Josephson junction form a closed superconducting current path, and wherein the first degree of freedom includes a persistent current in the first loop of superconducting material and the second degree of freedom includes a magnetic flux threading the compound Josephson junction.

At least one embodiment may be summarized as a coupling system including a first superconducting qubit comprising a qubit loop formed by a loop of superconducting material and a compound Josephson junction that interrupts the qubit loop, the compound Josephson junction comprising a closed loop of superconducting material interrupted by at least two Josephson junctions, where the qubit loop and the compound Josephson junction form a closed superconducting current path; a second superconducting qubit comprising a qubit loop formed by a loop of superconducting material and a compound Josephson junction that interrupts the qubit loop, the compound Josephson junction comprising a closed loop of superconducting material interrupted by at least two Josephson junctions, where the qubit loop and the compound Josephson junction form a closed superconducting current path; and a first coupling device that is formed by a closed superconducting current path, wherein the first coupling device includes a first magnetic flux inductor positioned proximate the qubit loop of the first qubit and configured to selectively provide a first mutual inductance coupling the first magnetic flux inductor to the qubit loop of the first qubit, and wherein the first coupling device includes a second magnetic flux inductor positioned proximate the compound Josephson junction of the second qubit and configured to selectively provide a second mutual inductance coupling the second magnetic flux inductor to the compound Josephson junction of the second qubit.

In some embodiments, the closed superconducting current path that forms the first coupling device may be interrupted by at least one Josephson junction. In some embodiments, the first coupling device includes a third magnetic flux inductor positioned proximate a programming interface and configured to selectively provide a third mutual inductance coupling the first coupling device to the programming interface.

Some embodiments may further include a second coupling device that is formed by a closed superconducting current path, wherein the second coupling device includes a first magnetic flux inductor positioned proximate the qubit loop of the second qubit and configured to selectively provide a first mutual inductance coupling the first magnetic flux inductor to the qubit loop of the second qubit, and wherein the second coupling device includes a second magnetic flux inductor positioned proximate the compound Josephson junction of the first qubit and configured to selectively provide a second mutual inductance coupling the second magnetic flux inductor to the compound Josephson junction of the first qubit.

In some embodiments, the closed superconducting current path that forms the second coupling device is interrupted by at least one Josephson junction. In some embodiments, the second coupling device includes a third magnetic flux inductor positioned proximate a programming interface and configured to selectively provide a third mutual inductance coupling the second coupling device to the programming interface.

At least one embodiment may be summarized as a method of controllably coupling a first qubit to a second qubit by an anti-symmetric coupling device, the first qubit comprising a qubit loop formed by a loop of superconducting material and a compound Josephson junction that interrupts the qubit loop, the compound Josephson junction comprising a closed loop of superconducting material interrupted by at least two Josephson junctions, where the qubit loop and the compound Josephson junction form a closed superconducting current path, the second qubit comprising a qubit loop formed by a loop of superconducting material and a compound Josephson junction that interrupts the qubit loop, the compound Josephson junction comprising a closed loop of superconducting material interrupted by at least two Josephson junctions, where the qubit loop and the compound Josephson junction form a closed superconducting current path, and the anti-symmetric coupling device comprising a closed superconducting current path that is interrupted by at least one Josephson junction, the method including coupling a first portion the coupling device to the qubit loop of the first qubit; coupling a second portion the coupling device to the compound Josephson junction of the second qubit; coupling a magnetic flux signal to the coupling device; and adjusting the magnetic flux signal.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
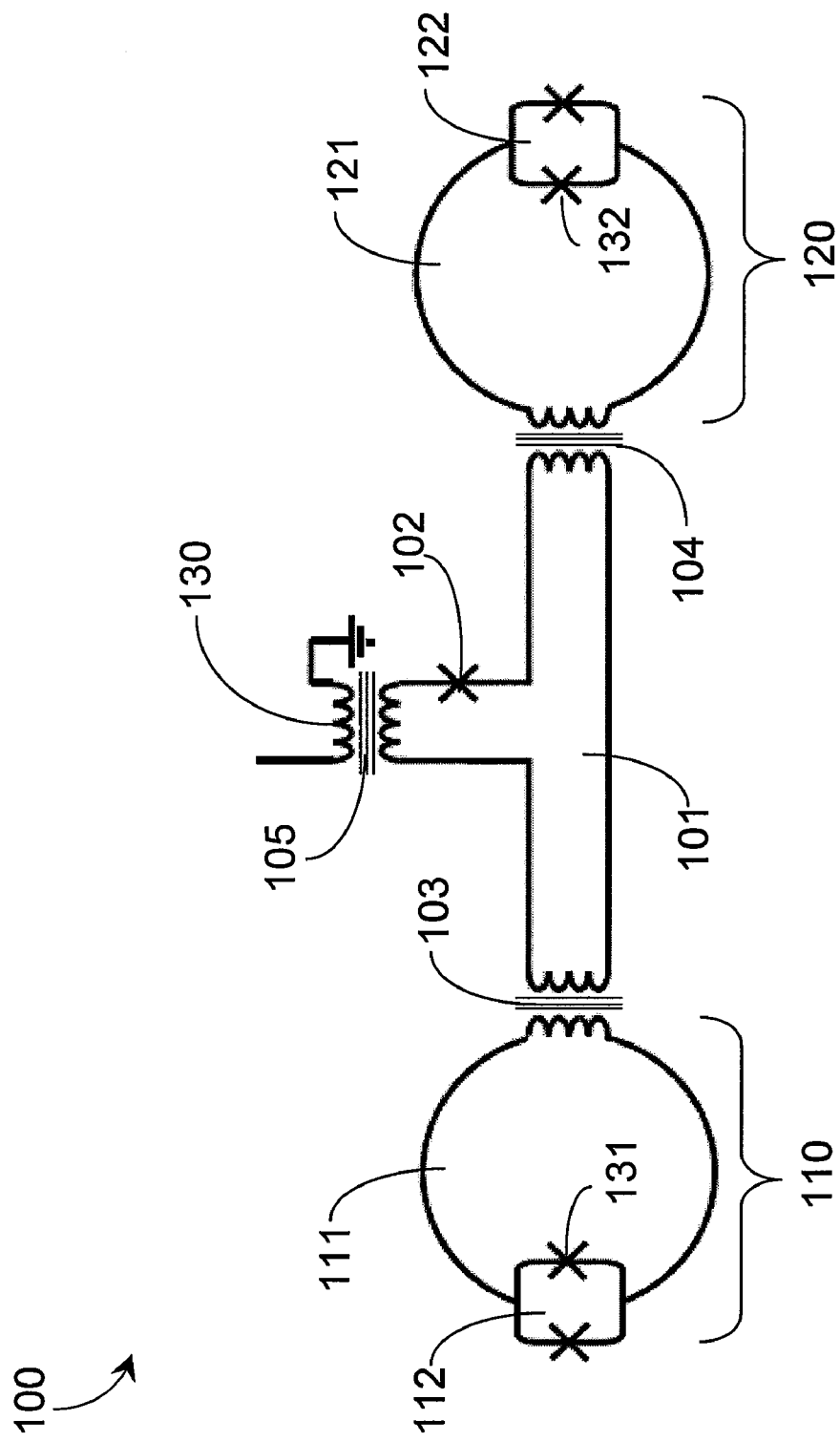
FIG. 1 shows a schematic diagram of a conventional controllable ZZ-coupler.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with quantum processors, such as quantum devices, coupling devices and control systems including microprocessors and drive circuitry have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The various embodiments described herein provide systems, methods and apparatus to communicably couple information between qubits in a quantum processor. In particular, systems, methods and apparatus are described to anti-symmetrically couple information between superconducting qubits in a superconducting quantum processor.

The behavior of superconducting qubits is typically controlled by a plurality of parameters or "degrees of freedom." These degrees of freedom may be programmed using a programming system, such as the programming systems described in U.S. patent application Ser. No. 11/950,276. Furthermore, these degrees of freedom provide means by or through which the superconducting qubits may interact with one another. A first qubit may interact with a second qubit by the coupling of information between a degree of freedom in the first qubit and a degree of freedom in the second qubit. The influence or effect of such an interaction depends on the type of information being coupled and the degrees of freedom that are involved.

As is understood in the art, each degree of freedom may correspond to a respective basis element defining the Hilbert space of a qubit. In the case of a superconducting flux qubit, the persistent current in the qubit loop is commonly associated with the Z-direction in the Hilbert space. Thus, a Z-Z (or "ZZ") interaction may be realized between two superconducting flux qubits by coupling information relating to the persistent current in the qubit loop of a first qubit to the qubit loop of a second qubit. Communicable coupling of the Z-degree of freedom of a pair of superconducting qubits may be realized by a superconducting ZZ-coupler, such as those described in Harris, R. et al., "Sign and Magnitude Tunable Coupler for Superconducting Flux Qubits", arXiv.org: cond-mat/0608253 (2006), pp. 1-5, and van der Brink, A. M. et al., "Mediated tunable coupling of flux qubits," New Journal of Physics 7 (2005) 230. A brief description of an exemplary ZZ-coupling device is now provided.

FIG. 1 shows a schematic diagram of a conventional controllable ZZ-coupler 100. This coupler 100 includes a loop of superconducting material 101 interrupted by a Josephson junction 102 and is used to couple a first qubit 110 and a second qubit 120 for use in a superconducting computer processor. First qubit 110 is comprised of a loop of superconducting material (or "qubit loop") 111 interrupted by a compound Josephson junction ("CJJ") 112 and is coupled to controllable coupler 100 through the exchange of flux 103 between coupler 100 and first qubit 110. Second qubit 120 is comprised of a loop of superconducting material (or "qubit loop") 121 interrupted by a CJJ 122 and is coupled to controllable coupler 100 through the exchange of flux 104 between coupler 100 and second qubit 120. Loop of superconducting material 101 is threaded by flux 105 created by electrical current flowing through a magnetic flux inductor 130.

ZZ-coupler 100 couples information regarding the persistent current in the qubit loop 111 of qubit 110 to the persistent current in the qubit loop 121 of qubit 120, and vice versa. Thus, ZZ-coupler 100 couples information between the Z-degree of freedom in qubit 110 and the Z-degree of freedom in qubit 120.

Flux 105 produced by magnetic flux inductor 130 threads loop of superconducting material 101 and controls the state of controllable coupler 100. Controllable coupler 100 is capable of producing a zero coupling between first qubit 110 and second qubit 120, an anti-ferromagnetic coupling between first qubit 110 and second qubit 120, and/or a ferromagnetic coupling between first qubit 110 and second qubit 120.

Variations and, for some applications, improvements to the ZZ-coupler design shown in FIG. 1 are presented in U.S. patent application Ser. No. 12/017,995, and U.S. Provisional Patent Application Ser. No. 60/915,657, filed May 2, 2007 and entitled "Systems, Devices, and Methods for Controllably Coupling Qubits."

ZZ-coupling is an effective means for controlling ZZ interactions between qubits in a quantum processor. However, in Biamonte et al., "Realizable Hamiltonians for Universal Adiabatic Quantum Computation", arXiv.org:quant-ph/0704.1287 (2007), pp. 1-4, it is recognized that ZZ qubit interactions by themselves are of limited utility with respect to the range of problems that can be solved with such hardware. In order to enable a quantum processor to solve a broader range of problems, it may be necessary to enable other forms of qubit interactions. In accordance with the present systems, methods and apparatus, new forms of qubit interactions are realized by the implementation of new coupling devices.

As previously described, the persistent current in the qubit loop of a superconducting flux qubit is commonly associated with the Z-direction of the qubit's Hilbert space. On the other hand, the flux threading the CJJ of a superconducting flux qubit controls the qubit's tunnel splitting, which is commonly associated with the X-direction of the qubit's Hilbert space. In accordance with the present systems, methods and apparatus, ZXqubit interactions may be achieved by coupling the Z-degree of freedom of a first qubit to the X-degree of freedom of a second qubit. Such ZXqubit interactions may be physically realized with superconducting flux qubits by coupling the persistent current in the qubit loop of a first qubit to the flux threading the CJJ of a second qubit. Those of skill in the art will appreciate that ZXqubit interactions may be of particular interest because the Z-basis and the X-basis are orthogonal in the qubit's Hilbert space.

Figure 2:
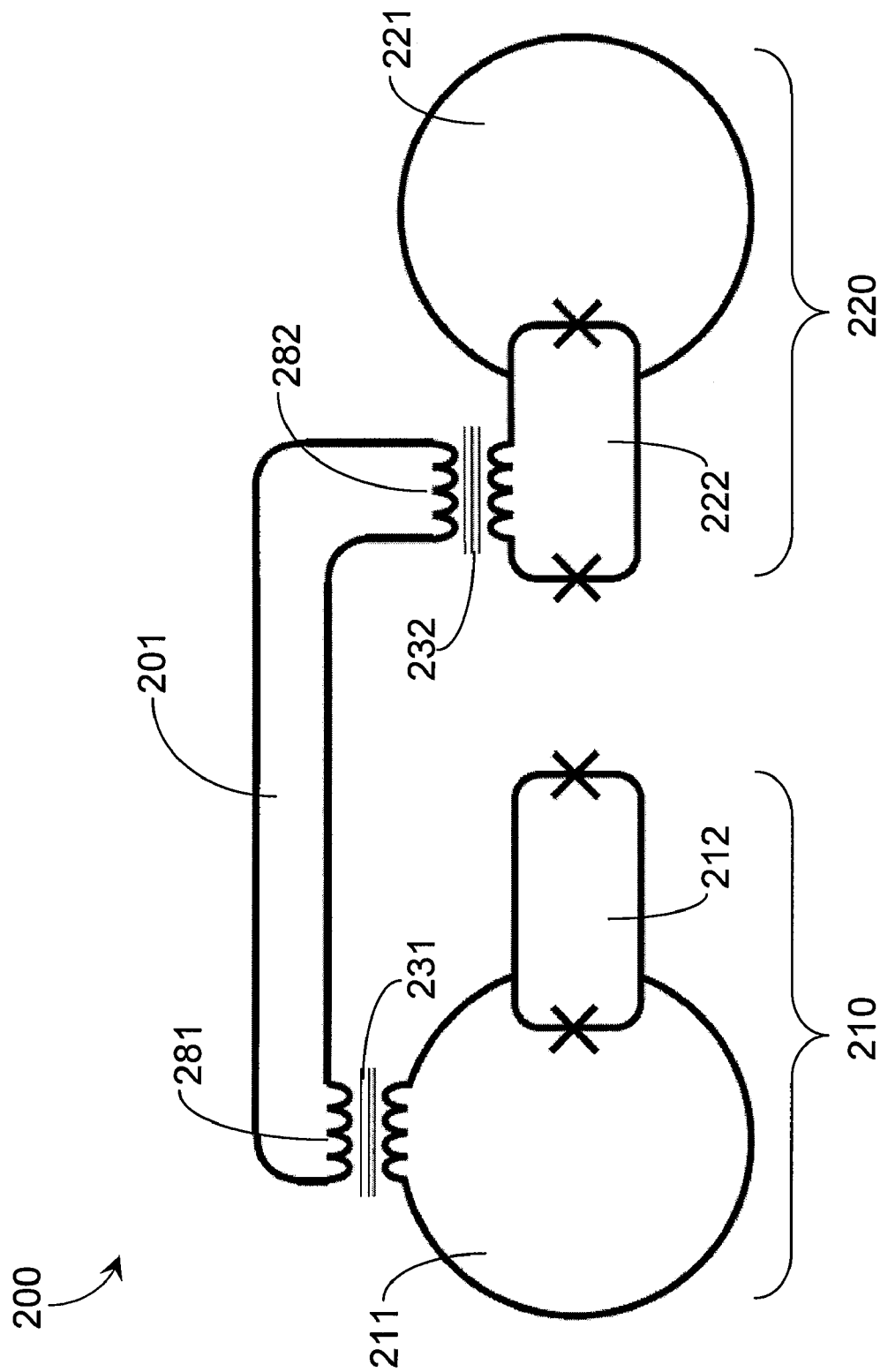
FIG. 2 is a schematic diagram of an embodiment of a system comprising two superconducting flux qubits and a ZX-coupler enabling ZX interactions therebetween.

FIG. 2 is a schematic diagram of an embodiment of a system 200 comprising two superconducting flux qubits 210, 220 and a ZX-coupler 201 enabling ZX interactions therebetween. Qubit 210 is comprised of a qubit loop 211 interrupted by a CJJ 212, and qubit 220 is similarly comprised of a qubit loop 221 interrupted by a CJJ 222. In the embodiment shown in FIG. 2, ZX-coupler 201 is formed by a closed loop of superconducting material that is inductively coupled to qubit 210 by the exchange of flux 231 with the qubit loop 211 of qubit 210. ZX-coupler 201 is also inductively coupled to qubit 220 by the exchange of flux 232 with the CJJ 222 of qubit 220. ZX-coupler 201 couples information between the persistent current in the qubit loop 211 of qubit 210 and the flux threading the CJJ 222 of qubit 220. If qubit 210 is bistable, then the direction of persistent current flow in qubit loop 211 may influence the magnitude of the tunneling rate in qubit 220 by inductive coupling to CJJ 222 of qubit 220.

In some embodiments, ZX-coupler 201 may include at least one magnetic flux inductor. In the illustrated embodiment of FIG. 2, ZX-coupler 201 includes two magnetic flux inductors 281, 282. Magnetic flux inductor 281 is positioned proximate the qubit loop 211 of qubit 210 to establish a mutual inductance therebetween and realize the exchange of flux 231. Magnetic flux inductor 282 is positioned proximate the CJJ 222 of qubit 220 to establish a mutual inductance therebetween and realize the exchange of flux 232. However, those of skill in the art will appreciate that the exchange of flux 231 and 232 may be realized, to some degree, without the inclusion of magnetic flux inductors 281 and 282. Whether or not magnetic flux inductors 281 and 282 are required depends on the magnitude of mutual inductance that is desired in the specific application of ZX-coupler 201.

ZX-coupler 201 couples information between the Z-degree of freedom in qubit 210 and the X-degree of freedom in qubit 220. Thus, ZX-coupler 201 provides ZX-coupling between qubits 210 and 220. In some embodiments, ZX-coupler 201 may operate substantially unidirectionally such that information from the Z-degree of freedom in qubit 210 influences the X-degree of freedom in qubit 220 with little "back-coupling" from qubit 220 to qubit 210.

Those of skill in the art will appreciate that the various components of system 200 are not drawn to scale and, in particular, their shapes, relative proportions, and relative positions have been adjusted for clarity of illustration.

In many applications, it is desirable to implement tunable coupling between qubits. In accordance with the present systems, methods and apparatus, the ZX-coupling principle taught in FIG. 2 is used to achieve tunable ZX-coupling by accordingly adapting ZX-coupler 201.

Figure 3:
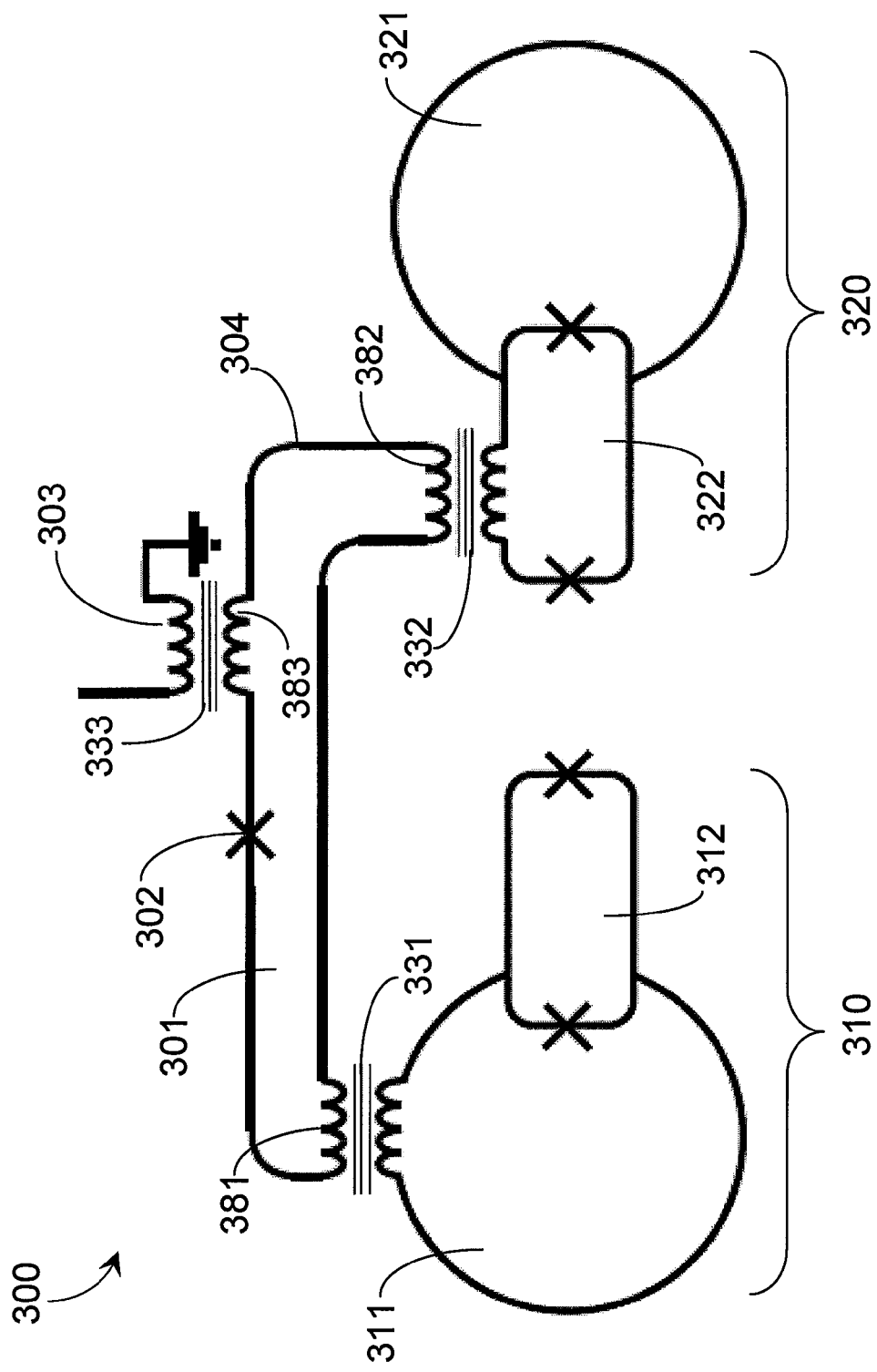
FIG. 3 is a schematic diagram of an embodiment of a system comprising two superconducting flux qubits and a tunable ZX-coupler enabling tunable ZX-interactions therebetween.

FIG. 3 is a schematic diagram of an embodiment of a system 300 comprising two superconducting flux qubits 310, 320 and a tunable ZX-coupler 301 enabling tunable ZX-interactions therebetween. Qubit 310 is comprised of a qubit loop 311 interrupted by a CJJ 312, and qubit 320 is similarly comprised of a qubit loop 321 interrupted by a CJJ 322. ZX-coupler 301 is formed by a closed loop of superconducting material 304 that is inductively coupled to qubit 310 by the exchange of flux 331 with the qubit loop 311 of qubit 310. ZX-coupler 301 is also inductively coupled to qubit 320 by the exchange of flux 332 with the CJJ 322 of qubit 320. Thus, system 300 is similar to system 200 shown in FIG. 2, except that ZX-coupler 301 includes additional features to achieve the desired tunability in coupling ZX-interactions between qubits 310 and 320. To this end, the closed loop of superconducting material 304 that forms ZX-coupler 301 is inductively coupled to a programming interface 303. Programming interface 303 may include a transformer that is coupled to some programmable control circuitry, such as the programming systems described in U.S. patent application Ser. No. 11/950,276. Flux 333 transferred by programming interface 303 threads loop of superconducting material 304 and controls the state of tunable ZX-coupler 301. The loop of superconducting material 304 is also interrupted by at least one Josephson junction 302. The combination of flux 333 from programming interface 303 and Josephson junction 302 allow the magnetic susceptibility of the loop of superconducting material 304 to be tuned in a manner similar to that described in van der Brink, A. M. et al., "Mediated tunable coupling of flux qubits," New Journal of Physics 7 (2005) 230.

In some embodiments, ZX-coupler 301 may include at least one magnetic flux inductor. In the illustrated embodiment of FIG. 3, ZX-coupler 301 includes three magnetic flux inductors 381-383. Magnetic flux inductor 381 is positioned proximate the qubit loop 311 of qubit 310 to establish a mutual inductance therebetween and realize the exchange of flux 331. Magnetic flux inductor 382 is positioned proximate the CJJ 322 of qubit 320 to establish a mutual inductance therebetween and realize the exchange of flux 332. Magnetic flux inductor 383 is positioned proximate the programming interface 303 to establish a mutual inductance therebetween and realize the exchange of flux 333. However, those of skill in the art will appreciate that the exchange of flux 331-333 may be realized, to some degree, without the inclusion of magnetic flux inductors 381-383. Whether or not magnetic flux inductors 381-383 are required depends on the magnitude of mutual inductance that is desired in the specific application of ZX-coupler 301.

As previously described, the ZX-coupling achieved from qubit 310 to qubit 320 by ZX-coupler 301 may, in some embodiments, be substantially unidirectional such that information from the Z-degree of freedom in qubit 310 influences the X-degree of freedom in qubit 320. Here, the term "ZX-coupling" refers to coupling "from the Z-degree of freedom in qubit 310 to the X-degree of freedom in qubit 320." Those of skill in the art will appreciate that the structural mirror-image of ZX-coupler 301 (that is, coupling from the qubit loop 321 of qubit 320 to the CJJ 312 of qubit 310) may be viewed as XZ-coupling, where the term "XZ-coupling" refers to coupling "to the X-degree of freedom in qubit 310 from the Z-degree of freedom in qubit 320." Thus, in some embodiments of the present systems, methods and apparatus, substantially unidirectional ZX-coupling may be realized by coupling from the Z-degree of freedom in a first qubit to the X-degree of freedom in a second qubit, while substantially unidirectional XZ-coupling may be realized by coupling from the Z-degree of freedom in a second qubit to the X-degree of freedom in a first qubit. In some applications, it may be advantageous to simultaneously provide both forms of coupling between a pair of qubits.

Figure 4:
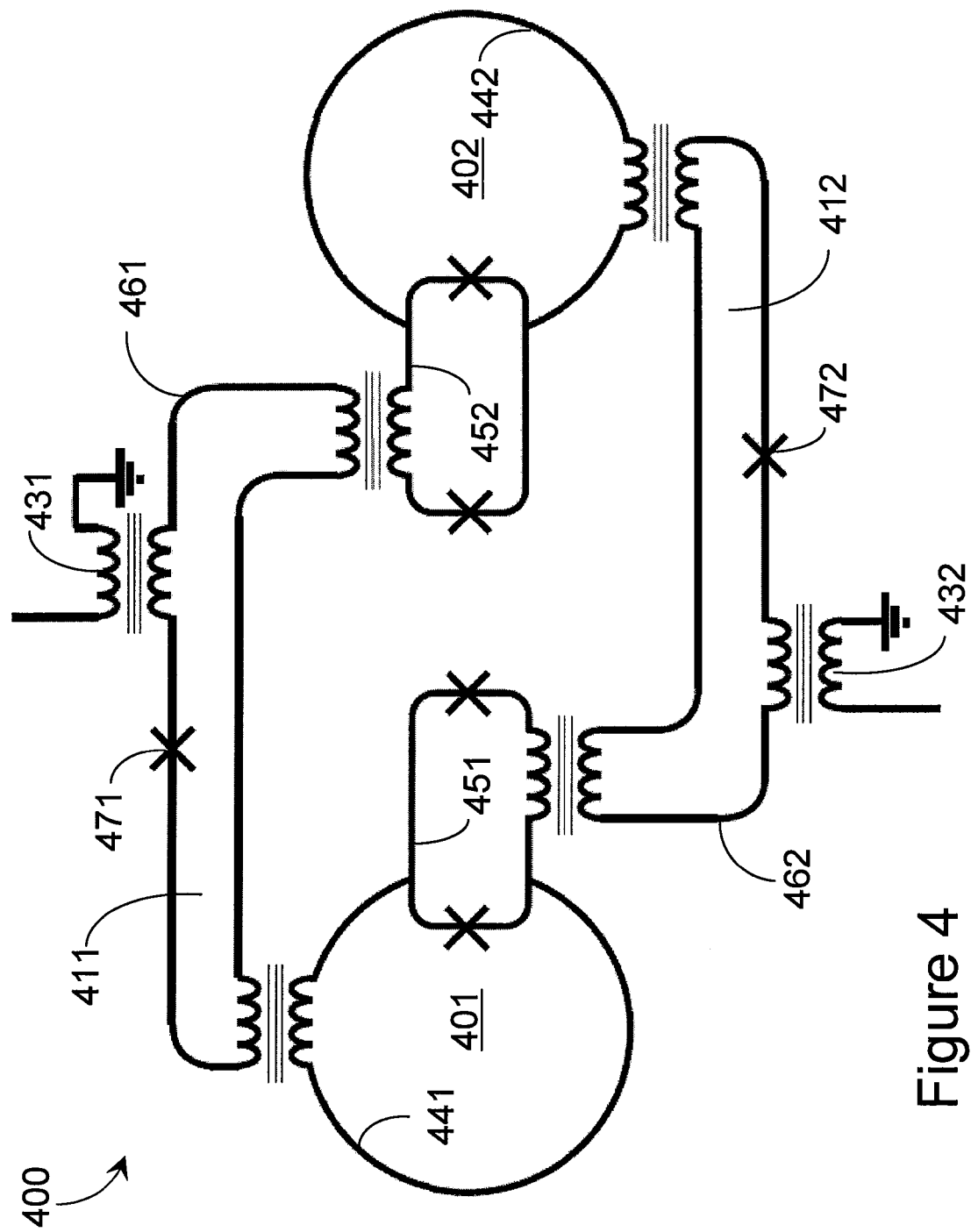
FIG. 4 is a schematic diagram of an embodiment of a system that includes two superconducting qubits and both a ZX-coupler and an XZ-coupler, each of which is configured to communicably couple information between the two qubits.

FIG. 4 is a schematic diagram of an embodiment of a system 400 that includes two superconducting qubits 401, 402 and both a ZX-coupler 411 and an XZ-coupler 412, each of which is configured to communicably couple information between qubits 401 and 402. Qubit 401 includes a qubit loop 441 formed by a closed superconducting current path that is interrupted by a CJJ 451. Similarly, qubit 402 includes a qubit loop 442 formed by a closed superconducting current path that is interrupted by a CJJ 452.

In accordance with the present systems, methods and apparatus, system 400 shown in FIG. 4 includes an exemplary embodiment of a ZX-coupler 411 and an exemplary embodiment of an XZ-coupler 412. ZX-coupler 411 includes a closed superconducting current path 461 that is inductively coupled to both the qubit loop 441 of qubit 401 and the CJJ 452 of qubit 402. Thus, ZX-coupler 411 provides coupling between the Z-degree of freedom in qubit 401 and the X-degree of freedom in qubit 402 by inductively coupling the persistent current in the qubit loop 441 of qubit 401 into the CJJ 452 of qubit 402. If qubit 401 is bi-stable, then the direction of persistent current flow in qubit loop 441 will influence the magnitude of the tunneling rate in the CJJ 452 of qubit 402.

In many applications, it is preferred to have "tunable" control over the coupling strength between qubits. In the case of ZX-coupler 411, tunability is realized by two tuning elements: closed superconducting current path 461 is interrupted by at least one Josephson junction 471 and closed superconducting current path 461 is inductively coupled to a programming interface 431. These tuning elements allow the susceptibility of ZX-coupler 411 to be tuned as described in A. Maassen van den Brink et al., New J. Phys. 7, 230 (2005).

Those of skill in the art will appreciate that the structure and operation of XZ-coupler 412 is effectively the "mirror-image" of the structure and operation of ZX-coupler 411. That is, XZ-coupler 412 includes a closed superconducting current path 462 that is inductively coupled to both the qubit loop 442 of qubit 402 and the CJJ 451 of qubit 401. Thus, XZ-coupler 412 provides coupling between the X-degree of freedom in qubit 401 and the Z-degree of freedom in qubit 402 by inductively coupling the persistent current in the qubit loop 442 of qubit 402 into the CJJ 451 of qubit 401. If qubit 402 is bi-stable, then the direction of persistent current flow in qubit loop 442 will influence the magnitude of the tunneling rate in the compound Josephson junction 451 of qubit 401. XZ-coupler 412 may also be made tunable by the combination of two tuning elements: closed superconducting current path 462 is interrupted by at least one Josephson junction 472 and closed superconducting current path 462 is inductively coupled to a programming interface 432.

Those of skill in the art will appreciate that the various components of system 400 are not drawn to scale and, in particular, their shapes, relative proportions, and relative positions have been adjusted for clarity of illustration.

The implementation of ZX- and XZ-coupling between qubits within the same quantum processor provides off-diagonal or "non-commuting" coupling. As described in Biamonte et al., off-diagonal coupling may be implemented to realize potentially more powerful forms of quantum computation, such as universal adiabatic quantum computation. Further descriptions of the use of ZX- and XZ-couplers in universal adiabatic quantum computation are provided in U.S. patent application Ser. No. 12/098,348, filed Apr. 4, 2008, and entitled "PHYSICAL REALIZATIONS OF A UNIVERSAL ADIABATIC QUANTUM COMPUTER". However, those of skill in the art will appreciate that, even in coupling architectures that are not universal, the incorporation of ZX qubit interactions may broaden the functionality of a quantum processor beyond that which is achievable with ZZ-coupling alone. ZXqubit interactions provide new functionality, at least in part, because the Z-basis and the X-basis are orthogonal.

Those of skill in the art will appreciate that the general concepts taught herein may be adapted to apply to various forms of qubits and, particularly, various forms of superconducting qubits.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, methods and apparatus of qubit coupling, not necessarily the exemplary systems, methods and apparatus for quit coupling generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application Ser. No. 60/910,445, filed Apr. 5, 2007, and entitled "Physical Implementations for a Universal Quantum Computer and Related Coupling Devices", U.S. Pat. Nos. 6,838,694, 7,335,909, US Patent Publication No. 2006-0225165, U.S. patent application Ser. No. 12/013,192, U.S. Provisional Patent Application Ser. No. 60/986,554 filed Nov. 8, 2007 and entitled "Systems, Devices and Methods for Analog Processing", US Patent Publication No. 2006-0147154, U.S. patent application Ser. No. 12/017,995, U.S. Provisional Patent Application Ser. No. 60/915,657, filed May 2, 2007 and entitled "Systems, Devices, and Methods for Controllably Coupling Qubits", U.S. patent application Ser. No. 11/950,276, and U.S. patent application Ser. No. 12/098,348, filed Apr. 4, 2008 and entitled "PHYSICAL REALIZATIONS OF A UNIVERSAL ADIABATIC QUANTUM COMPUTER", are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A coupling system comprising:
   a first superconducting qubit comprising a qubit loop formed by a closed superconducting current path and a compound Josephson junction that interrupts the qubit loop, wherein the compound Josephson junction is formed by a closed superconducting current path that is interrupted by at least two Josephson junctions;
   a second superconducting qubit comprising a qubit loop formed by a closed superconducting current path and a compound Josephson junction that interrupts the qubit loop, wherein the compound Josephson junction is formed by a closed superconducting current path that is interrupted by at least two Josephson junctions; and
   a first coupling device that is formed by a closed superconducting current path, wherein the first coupling device is communicably coupleable to the qubit loop of the first qubit and communicably coupleable to the compound Josephson junction of the second qubit.

2. The coupling system of claim 1 wherein the first coupling device is inductively coupled to both the qubit loop of the first qubit and the compound Josephson junction of the second qubit.

3. The coupling system of claim 1 wherein the closed superconducting current path that forms the first coupling device is interrupted by at least one Josephson junction.

4. The coupling system of claim 1 wherein the closed superconducting current path that forms the first coupling device is inductively coupled to a programming interface.

5. The coupling system of claim 1 wherein the first qubit, the second qubit, and the first coupling device form at least a portion of a superconducting quantum processor.

6. The coupling system of claim 1 wherein the first coupling device includes a first magnetic flux inductor and a second magnetic flux inductor, the first magnetic flux inductor positioned to receive magnetic flux from the qubit loop of the first qubit and the second magnetic flux inductor positioned to thread a magnetic flux through the compound Josephson junction of the second qubit.

7. The coupling system of claim 1, further comprising:
   a second coupling device that is formed by a closed superconducting current path, wherein the second coupling device is communicably coupleable to the qubit loop of the second qubit and is communicably coupleable to the compound Josephson junction of the first qubit.

8. The coupling system of claim 7 wherein the second coupling device is inductively coupled to both the qubit loop of the second qubit and the compound Josephson junction of the first qubit.

9. The coupling system of claim 7 wherein the closed superconducting current path that forms the second coupling device is interrupted by at least one Josephson junction.

10. The coupling system of claim 7 wherein the closed superconducting current path that forms the second coupling device is inductively coupled to a programming interface.

11. The coupling system of claim 7 wherein the first qubit, the second qubit, the first coupling device, and the second coupling device form at least a portion of a superconducting quantum processor.

12. A coupling system comprising:
    a first qubit having a first degree of freedom that is associated with a first basis element and a second degree of freedom that is associated with a second basis element;
    a second qubit having a first degree of freedom that is associated with the first basis element and a second degree of freedom that is associated with the second basis element; and
    a coupling device that communicably couples the first degree of freedom of the first qubit with the second degree of freedom of the second qubit, such that the first degree of freedom of the first qubit influences the second degree of freedom of the second qubit.

13. The coupling system of claim 12 wherein the first basis element and the second basis element are orthogonal.

14. The coupling system of claim 12, wherein the first qubit is a superconducting qubit comprising a first loop of superconducting material and a compound Josephson junction that interrupts the first loop of superconducting material, the compound Josephson junction comprising a closed loop of superconducting material interrupted by at least two Josephson junctions, where the first loop of superconducting material and the compound Josephson junction form a closed superconducting current path, and wherein the first degree of freedom includes a persistent current in the first loop of superconducting material and the second degree of freedom includes a magnetic flux threading the compound Josephson junction.

15. A coupling system comprising:
    a first superconducting qubit comprising a qubit loop formed by a loop of superconducting material and a compound Josephson junction that interrupts the qubit loop, the compound Josephson junction comprising a closed loop of superconducting material interrupted by at least two Josephson junctions, where the qubit loop and the compound Josephson junction form a closed superconducting current path;
    a second superconducting qubit comprising a qubit loop formed by a loop of superconducting material and a compound Josephson junction that interrupts the qubit loop, the compound Josephson junction comprising a closed loop of superconducting material interrupted by at least two Josephson junctions, where the qubit loop and the compound Josephson junction form a closed superconducting current path; and
    a first coupling device that is formed by a closed superconducting current path, wherein the first coupling device includes a first magnetic flux inductor positioned proximate the qubit loop of the first qubit and configured to selectively provide a first mutual inductance coupling the first magnetic flux inductor to the qubit loop of the first qubit, and wherein the first coupling device includes a second magnetic flux inductor positioned proximate the compound Josephson junction of the second qubit and configured to selectively provide a second mutual inductance coupling the second magnetic flux inductor to the compound Josephson junction of the second qubit.

16. The coupling system of claim 15 wherein the closed superconducting current path that forms the first coupling device is interrupted by at least one Josephson junction.

17. The coupling system of claim 15 wherein the first coupling device includes a third magnetic flux inductor positioned proximate a programming interface and configured to selectively provide a third mutual inductance coupling the first coupling device to the programming interface.

18. The coupling system of claim 15, further comprising:
a second coupling device that is formed by a closed superconducting current path, wherein the second coupling device includes a first magnetic flux inductor positioned proximate the qubit loop of the second qubit and configured to selectively provide a first mutual inductance coupling the first magnetic flux inductor to the qubit loop of the second qubit, and wherein the second coupling device includes a second magnetic flux inductor positioned proximate the compound Josephson junction of the first qubit and configured to selectively provide a second mutual inductance coupling the second magnetic flux inductor to the compound Josephson junction of the first qubit.

19. The coupling system of claim 18 wherein the closed superconducting current path that forms the second coupling device is interrupted by at least one Josephson junction.

20. The coupling system of claim 18 wherein the second coupling device includes a third magnetic flux inductor positioned proximate a programming interface and configured to selectively provide a third mutual inductance coupling the second coupling device to the programming interface.

21. A method of controllably coupling a first qubit to a second qubit by an anti-symmetric coupling device, the first qubit comprising a qubit loop formed by a loop of superconducting material and a compound Josephson junction that interrupts the qubit loop, the compound Josephson junction comprising a closed loop of superconducting material interrupted by at least two Josephson junctions, where the qubit loop and the compound Josephson junction form a closed superconducting current path, the second qubit comprising a qubit loop formed by a loop of superconducting material and a compound Josephson junction that interrupts the qubit loop, the compound Josephson junction comprising a closed loop of superconducting material interrupted by at least two Josephson junctions, where the qubit loop and the compound Josephson junction form a closed superconducting current path, and the anti-symmetric coupling device comprising a closed superconducting current path that is interrupted by at least one Josephson junction, the method comprising:
coupling a first portion the coupling device to the qubit loop of the first qubit;
coupling a second portion the coupling device to the compound Josephson junction of the second qubit;
coupling a magnetic flux signal to the coupling device; and
adjusting the magnetic flux signal.

* * * * *